United States Patent
Bergholtz et al.

(10) Patent No.: US 12,043,437 B2
(45) Date of Patent: Jul. 23, 2024

(54) LASER ABLATION MARKING SYSTEM FOR AND A METHOD OF PROVIDING AN IMAGE TO A WEB OF PACKAGING MATERIAL

(71) Applicant: Tetra Laval Holdings & Finance S.A., Pully (CH)

(72) Inventors: Lars Bergholtz, Höganäs (SE); Paolo Scarabelli, Reggio Emilia (IT); Lars Palm, Åkarp (SE); Gian Paolo Meloni, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/257,350

(22) PCT Filed: Jul. 5, 2019

(86) PCT No.: PCT/EP2019/068137
§ 371 (c)(1),
(2) Date: Dec. 31, 2020

(87) PCT Pub. No.: WO2020/008047
PCT Pub. Date: Jan. 9, 2020

(65) Prior Publication Data
US 2021/0292027 A1    Sep. 23, 2021

(30) Foreign Application Priority Data
Jul. 5, 2018   (EP) ..................................... 18181913

(51) Int. Cl.
*B65B 61/02*   (2006.01)
*B23K 26/06*   (2014.01)
(Continued)

(52) U.S. Cl.
CPC ........ *B65B 61/025* (2013.01); *B23K 26/0604* (2013.01); *B23K 26/083* (2013.01); *B23K 26/352* (2015.10); *B23K 2103/40* (2018.08)

(58) Field of Classification Search
CPC ... B65B 61/025; B65B 3/025; B23K 26/0604; B23K 26/083; B23K 26/352; B23K 2103/40; B23K 26/0846; B23K 26/361
See application file for complete search history.

(56) References Cited

U.S. PATENT DOCUMENTS 6,400,389 B1 *  6/2002  Shaffer ................ G03B 17/245
                                                    219/121.84
8,164,025 B1     4/2012  Kunas
(Continued)

FOREIGN PATENT DOCUMENTS

CN      1313801 A      9/2001
CN    101157159 A  *  4/2008
(Continued)

OTHER PUBLICATIONS

Communication under Rule 71(3) dated Dec. 2, 2020, for corresponding European Patent Application No. 19184744.1.
(Continued)

*Primary Examiner* — Geoffrey S Evans
(74) *Attorney, Agent, or Firm* — Renner, Otto, Boisselle & Sklar, LLP (57) ABSTRACT

A laser ablation marking system for providing an image to a web of packaging material is provided. The marking system includes at least one marking device having at least one laser having a plurality of individually controlled light outputs arranged in the cross-wise direction of the web of packaging material, each light output having a power output of at least 60 W and being configured to emit light to provide laser ablation, and a controller being connected to the marking device and configured to control the light outputs (Continued)

based on the speed of the web of packaging material such that the emitted light will always hit the web of packaging material at the same angle.

21 Claims, 4 Drawing Sheets

(51) Int. Cl.
*B23K 26/08* (2014.01)
*B23K 26/352* (2014.01)
*B23K 103/00* (2006.01)

(56) References Cited

U.S. PATENT DOCUMENTS

| | | | | |
|---|---|---|---|---|
| 8,625,152 | B2* | 1/2014 | Graushar | G06F 3/1251 |
| | | | | 358/1.7 |
| 9,348,026 | B2* | 5/2016 | Armbruster | G01S 15/06 |
| 2003/0029850 | A1* | 2/2003 | Varriano-Marston | |
| | | | | B65B 61/02 |
| | | | | 219/121.71 |
| 2005/0140763 | A1 | 6/2005 | Jackson | |
| 2009/0323753 | A1* | 12/2009 | Gmeiner | B23K 26/355 |
| | | | | 372/50.122 |
| 2012/0206739 | A1 | 8/2012 | Graushar et al. | |
| 2013/0057637 | A1 | 3/2013 | Sen et al. | |
| 2016/0301064 | A1 | 10/2016 | Barthe | |
| 2018/0114083 | A1 | 4/2018 | Richter et al. | |

FOREIGN PATENT DOCUMENTS

| | | | | |
|---|---|---|---|---|
| CN | 101157159 | A | 4/2008 | |
| CN | 101490618 | A | 7/2009 | |
| CN | 105034614 | A | 11/2015 | |
| EP | 0157546 | A2 | 10/1985 | |
| EP | 0 950 973 | A2 | 10/1999 | |
| EP | 2 565 124 | A1 | 3/2013 | |
| EP | 3251783 | A1 | 12/2017 | |
| JP | H11-58665 | A | 3/1999 | |
| JP | 2000-102886 | A | 4/2000 | |
| JP | 2012-101228 | A | 5/2012 | |
| JP | 2013111070 | A | 6/2013 | |
| WO | 2000035678 | A1 | 6/2000 | |
| WO | 2003097361 | A2 | 11/2003 | |
| WO | 2006114600 | A2 | 11/2006 | |
| WO | WO-2006114600 | A2 * | 11/2006 | ............ B41J 2/471 |
| WO | 2016/166379 | A1 | 10/2016 | |

OTHER PUBLICATIONS

International Search Report for corresponding Application No. PCT/EP2019/068137, dated Sep. 9, 2019.
First Office Action dated Aug. 2, 2022, for corresponding Chinese Patent Application No. 201980045395.8.
Adelina Han et al.; Analysis of the Laser Marking Technologies; Nonconventional Technologies Review; 2008; pp. 17-22; No. 4.
O.P. Kowalksi; The Development of Laser Diode Arrays for Printing Applications; Semiconductor Laser Diode Technology and Applications; Intense, Inc.; pp. 263-288; 2012.
How to Design Registration Marks that can be Read by a Contrast Sensors; SICKUSAblog; dated Nov. 11, 2017.
Decision in Opposition proceedings dated Feb. 26, 2024, for European Patent Application No. 19184744.1.

* cited by examiner

LASER ABLATION MARKING SYSTEM FOR AND A METHOD OF PROVIDING AN IMAGE TO A WEB OF PACKAGING MATERIAL

TECHNICAL FIELD

The invention relates to a marking system for web-based material, such as packaging material. In particular the present invention relates to a stationary system for providing laser ablated marks on a web of packaging material.

BACKGROUND ART

In the packaging industry, especially for producing individual consumer packages for content such as liquid food, the packages are manufactured by forming and sealing a planar packaging material. The packaging material, which typically comprises a core layer of bulk material being covered on both sides by one or more polymer layers, is produced as a continuous web.

The filling machine receives one end of the web of the laminated packaging material and a plurality of stations provide the required processing of the packaging material in a continuous manner. Such stations may e.g. include feeding, sterilization, tube forming, filling, sealing and cutting, and final forming in order to provide a flow of individual ready-to-use packages.

The web of packaging material is running at extremely high speed; machine speeds allowing for up to 40.000 packages per hour are commercially available. Also during lamination and production of the packaging material high speed are utilized, whereby the speed of the web is in the order of e.g. 400 m/min and above.

Manufacturing of the web of packaging material, as well as transportation of the web through the filling machine, requires high precision position control. For example, manufacturing of the packaging material may include the step of providing folding crease lines, pre-cut holes, and printed patterns such as register marks and/or décor. Especially the printing step may be performed in separate steps, and the appearance of the final package will be dependent on the alignment of the different features. Uncontrolled variations in the positioning of the packaging material during production in the converting factory or in the filling machine may induce various types of errors.

Hence it is not only desirable to provide high precision alignment between the pre-laminated hole and the crease lines, but also to provide high precision alignment of the printed pattern relative the crease lines, the pre-cut hole, external devices such as caps and similar, as well as relative previous printed patterns.

Yet further it is desirable to add unique information to the web of packaging material. Such information may e.g. be related to manufacturing date, the converting factory, etc. for traceability and/or authentication purposes. The information may e.g. be provided in a coded format, or characters or images may be used.

A unique code can also be used for tracking errors and/or deviations in converting, and such marks may additionally facilitate defect removal.

Marking of the packaging material may thus be performed for different purposes, i.e. either to provide unique information or to provide reference marks for positioning. By reading the reference mark it may thus be possible to adjust for the position of the web of packaging material, especially in lateral or cross-wise direction, or to read encoded information. Subsequent printing, made by continuous printing techniques such as off-set printing, may thus be positioned correctly relative the reference mark, and hence also relative other features added to the packaging material.

One system for providing marks on packages is disclosed in WO2016166379. In this system an image to be printed is divided in two or more parts, and a laser is configured to ablate at least one of the image parts to form a corresponding mark on the package. Optionally, several lasers are provided to ablate respective parts of the image.

Each laser emits light through an optical system having two mirrors which can be moved to divert the laser beam in x-y directions. As the package passes the laser the moveable mirrors thus assist in providing a two-dimensional ablated mark corresponding to an image part.

The system described above suffers from two major drawbacks. Firstly, as the moveability of the mirrors is limited several lasers and associated mirrors are provided to extend the lateral, or cross-wise dimensions of the ablated mark.

Secondly, for high-speed application control of the mirrors will be practically impossible since the time required for physically moving the mirrors will result in a curved ablation; during the time needed for moving the mirrors the package has moved in the feeding direction whereby the mark will be tilted relative the cross-wise direction of the package.

SUMMARY

It is an object of the invention to at least partly overcome one or more of the above-identified limitations of the prior art. In particular, it is an object to provide a system and method being capable of providing unique laser ablated marks with high precision on a web of packaging material running at very high speed, such as 400 m/min or above.

To solve these objects a laser ablation marking system for providing an image to a web of packaging material is provided. The marking system comprises at least one marking device having at least one laser comprising a plurality of individually controlled light outputs arranged in the crosswise direction of the web of packaging material. Each light output is capable of emitting light to provide laser ablation, and the power of the emitted light is for this purpose in the range of 60 W or higher, such as 100 W or higher, such as 200 W or higher. The laser ablation marking system further comprises a controller being connected to the marking device and configured to control the light outputs based on the speed of the web of packaging material such that the emitted light will always hit the web of packaging material at the same angle.

In an embodiment, the power of the emitted light from each light output is in the range of 60-1000 W, such as 60-500 W.

The marking system may further comprise at least one coating device configured to provide a coated area onto the web of packaging material.

The at least one coating device may be arranged upstream the at least one marking device.

The plurality of light outputs may be arranged in a linear array.

The linear array may extend in a direction being perpendicular to the travel direction of the web of packaging material.

The number of light outputs may be above ten, such as above fifteen, preferably above twenty.

Each light output may be connected to an optical fiber having a distal end at which a laser beam is allowed to exit.

The dimension of the outputted laser beam, when hitting the web of packaging material, may be 1 mm² or less.

The controller may be configured to activate the marking device in a pulsed manner.

For each pulse, the plurality of light outputs may be controlled individually.

The controller may be configured to controlling each light output binary to either emit light or not.

The controller may be configured to controlling the marking device in order to remove, or ablate selected parts of a coating substance arranged on a coated area on said web of packaging material.

The controller may be configured to controlling the marking device to ablate the entire layer of coating substance at said selected parts.

The controller may be configured to controlling the marking device to ablate only a part of the layer of coating substance at said selected parts.

The web is moving at a constant speed, i.e. continuously travelling forward, in the lengthwise direction of the web.

According to a second aspect, a method for laser ablation of an image to a web of packaging material is provided. The method comprises i) providing at least one marking device having at least one laser and a plurality of individually controlled light outputs connected to said at least one laser, wherein each light output is capable of emitting light to provide laser ablation; the power of the emitted light is for this purpose in the range of 60 W or higher, ii) providing a controller being connected to the marking device and configured to control the light outputs based on the speed of the web of packaging material, and iii) controlling at least one of the light outputs to emit light in order to ablate selected parts of a coating substance arranged on a coated area on said web of packaging material such that the emitted light will always hit the web of packaging material at the same angle.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
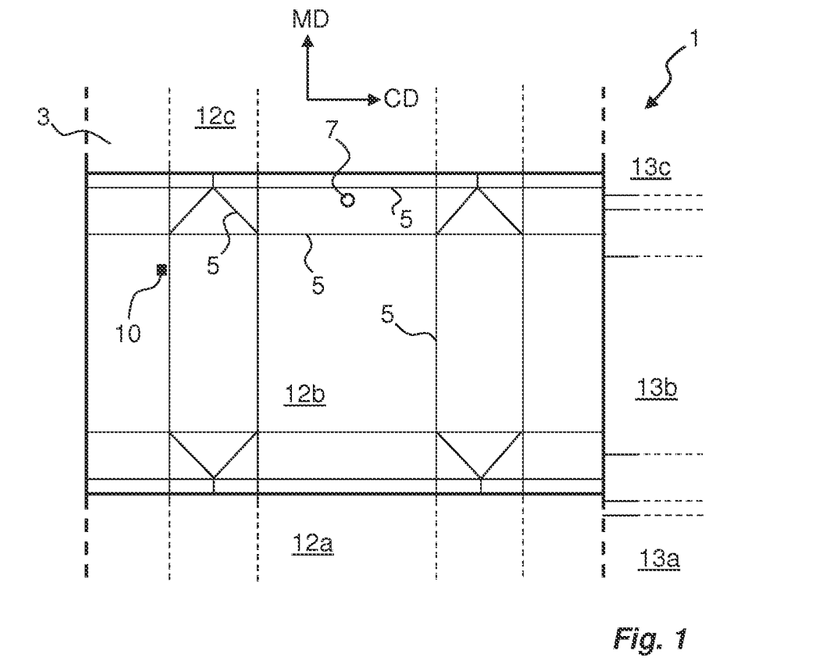
FIG. 1 is a top view of a packaging material forming a part of a web.

In FIG. 1 parts of a web 1 of a packaging material 3 is shown. The packaging material 3 is provided with several features for facilitating forming of individual packages. Such features may e.g. include crease lines 5, pre-laminated holes 7, and one or more laser ablated marks 10. As can be seen in FIG. 1 during manufacturing of the packaging material 3 the web 1 is dimensioned to accommodate several segments 12a-c, 13a-c, whereby each segment 12a-c, 13a-c is dimensioned to produce a single package. The segments are arranged in sequence, both in lengthwise direction, machine direction MD and cross-wise direction CD. Preferably the segments 12a-c, 13a-c are staggered in the cross-wise direction CD, as further shown in FIG. 3, for reducing vibrations during creasing and allowing smoother operation of the rotary creasing tool across the width of the packaging material web.

The mark 10 may be provided for various purposes, as explained above. It may e.g. form a reference mark for future handling of the packaging material, or it may include some kind of information which may be read and used for traceability or authentication.

The packaging material 3 is preferably manufactured in a converting facility, where a core layer of a paper-based material is laminated with one or more polymer layers on both sides. Typically the packaging material 3 comprises a core material layer, an outer layer, and an inner layer.

The outer layer applied to one side of the core material layer is adapted to provide the outer surface of the package to be produced, which outer surface and outer layer faces the surroundings of the package. The inner layer is applied to the other side of the core material layer and is adapted to provide the inner surface of the package to be produced which is in contact with the product contained in the package.

The core material may be a sheet for providing rigidity to the packaging material 3, and may preferably be made of material such as paper board or cardboard.

The outer layer may comprise at least one layer of polymer material, which is applied to the core material layer in a lamination process. Moreover, one of the layers making up the outer layer may be a decorative layer making up the outer appearance of the package to be formed. The process of laminating the outer layer to the core material layer is preferably performed after the mark(s) 10 has been added to the packaging material 3, such as in the manufacturing line for production of laminated packaging material. Alternatively, the operation of laser ablating marks in a coated layer may take place after the lamination and manufacturing of the packaging material, e.g. in a filling machine.

The inner portion of the laminated packaging material, on the inner, opposite side of the core layer, may comprise at least one layer of polymer material. The inner portion of the packaging material intended for the inside of the finished package, may e.g. comprise (starting from the core material layer): a lamination layer, a protective layer such as an Aluminum foil, functioning as a barrier against gases, such as oxygen gas, and a sealing layer. The lamination layer enables the core material to stick to any protective layer applied, while the sealing layer enables package heat sealing.

The polymer layers of the packaging material 3 may be of any suitable type of polymer material, preferably a thermoplastic material such as a polyolefin, such as polyethylene.

Figure 2:
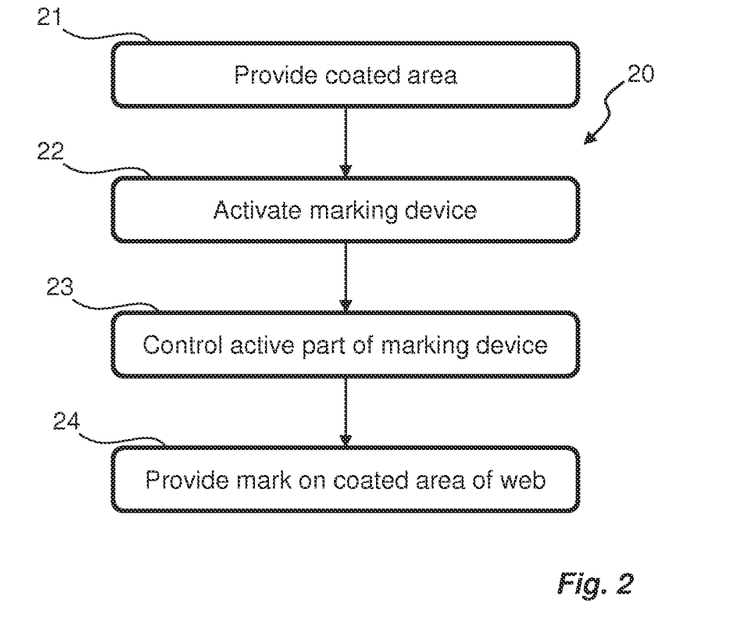
FIG. 2 schematically shows a method according to an embodiment.

Before describing details of the marking system used for providing laser ablated marks to the packaging material 3, a method 20 will be briefly described with reference to FIG. 2. When adding a laser ablated mark 10 to the packaging material 3 a number of subsequent steps are performed. Starting in step 21, the packaging material 3 is coated such that a coated area is arranged at the location of the desired mark. Coating may e.g. be accomplished by printing. The specific dimensions of the coated area is of less importance, as long as the mark to be formed may fit within the outer boundaries of the coated area.

When the area is coated, a marking device is activated in step 22. The marking device, being a laser device having multiple outputs being individually controllable as will be further described below, receives upon activation data relating to the intended position of the mark as well as data relating to the intended pattern. The position of the created mark will preferably be in register with one or more crease patterns and the remaining printed design of the packaging material. Controlling the marking device, i.e. setting operation parameters in order to activate one or more of the multiple outputs at specific times, is performed in step 23. In operation, i.e. when the marking device is emitting light according to the set control scheme, the emitted light will ablate the coating substance of the coated area whereby the underlying core material layer will be exposed. A contrast between the coated area (i.e. the unexposed portions of the coated are) and the core material layer (i.e. the ablated portions of the coated area) will thereby result in a pattern being readable by optical means such as a camera, a scanner, or human eyes.

This step of operating the marking device to emit light, and thereby ablate selective portions of the coated area, thus forms a step 24 of providing the mark 10 onto the packaging material 3.

The above-described method is suitable for high speed applications, still maintaining good accuracy and high resolution of the ablated mark. The marking device may e.g. have at least ten individually controllable outputs arranged in the cross-wise direction of the web of packaging material, each output being stationary relative the moving packaging material.

The web is thus moving at a constant speed, i.e. continuously travelling forward, in the lengthwise direction of the web, while operating the laser ablation marking system. The web travelling speed may be 300 m/min and higher, such as 400 m/min and higher, such as 600 m/min and higher. The higher the web speed, the higher power light output will be needed from the laser light sources.

In order to perform laser ablation of high speed as typically required in modern production facilities, high power light output is required. As will be further explained in the following, it has been proven that each light output must be configured to emit light having a power of at least 60 W, such as in the range of 60-1000 W, such as from 60 to 500 W, depending on packaging material specifications, manufacturing conditions, etc.

Figure 3:
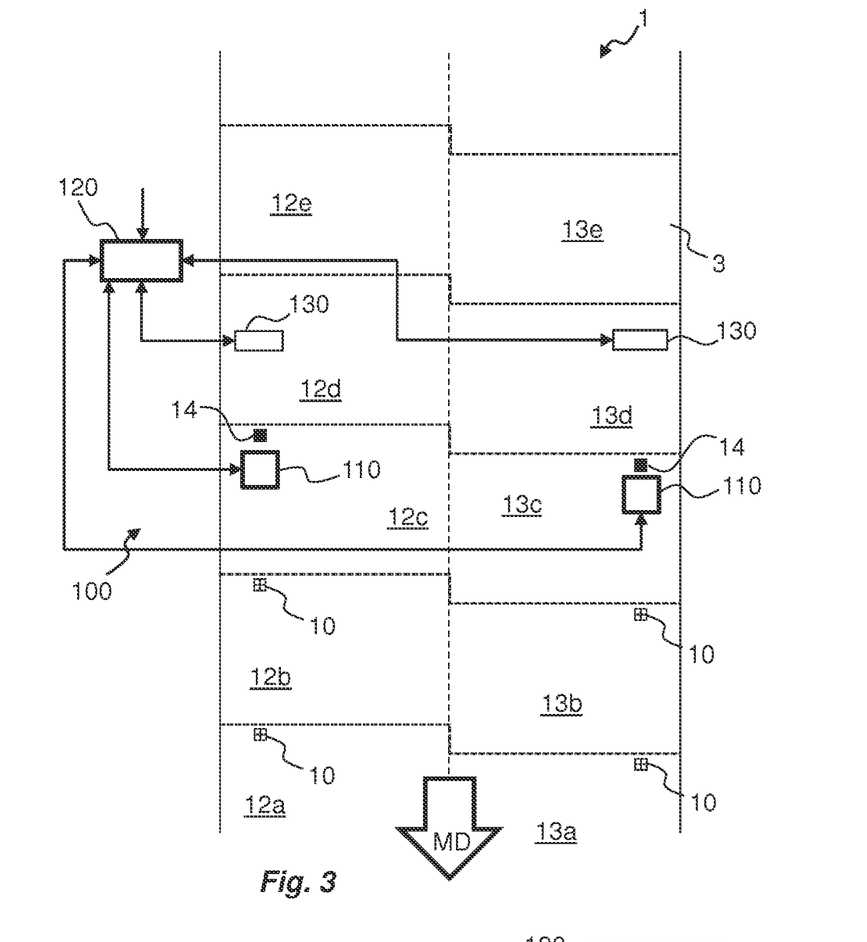
FIG. 3 is a schematic view of a laser ablation marking system according to an embodiment.

An example of a laser ablation marking system 100 is shown in FIG. 3. The laser ablation marking system 100 is configured to operate in conjunction with a web 1 of packaging material 3, which is fed forward in a lengthwise direction MD, indicated by the arrow in FIG. 3. Importantly, this configuration allows the laser ablation marking system 100 to fit with existing converting stations which typically converts a core material layer (such as a paper board or carton board) to a packaging material 3 by lamination. Preferably, the laser ablation marking system 100 is provided upstream a lamination station used to provide the outer layer onto the core material layer.

The purpose of the laser ablation marking system 100 is to provide one or more laser ablated marks 10 onto the packaging material 3. This is achieved by one or more marking devices 110, each marking device 110 being connected to a controller 120.

Each marking device 110 is arranged at a fixed position relative the surrounding equipment. This means that each marking device 110 will have a fixed position, i.e. in the cross-wise direction, also relative the web of packaging material 3 being fed through the marking system 100. Laser ablation marking thus enables an efficient way of marking a substrate, in comparison to conventional printing techniques, such as ink-jet printing, in particular of codes and the like, such as QR-codes or bar codes.

As can be seen in FIG. 3 the web of packaging material 3 is dimensioned so that the entire width of the web 1 corresponds to the required width for forming two packages. Segments 12*a-e* are longitudinally aligned, while segments 13*a-e* are longitudinally aligned and arranged adjacent to segments 12*a-e*. This configuration is applied for increasing the throughput during converting; before feeding the packaging material 3 to a filling machine, segments 13*a-e* are normally separated from segments 12*a-e* by a longitudinal cutting operation. As already explained, each segment 12*a-e*, 13*a-e* is designed to form one package.

As the web 1 of packaging material 3 travels forward, each marking device 110 will be activated to ablate an optical pattern into a coated area 14 which is arranged on the packaging material 3. If each package is intended to have a mark 10, each segment 12*a-e*, 13*a-e* is provided with a coated area 14. In FIG. 3 the coated areas 14 are made by means of coating devices 130. Each coating device 130 is configured to apply a coating substance onto the packaging material 3, preferably directly onto the core material layer before it is ablated and thereafter laminated with an outer layer. The coating devices 130 may e.g. be configured as printing rollers or similar. As the coated area 14 should be homogenous and fully covered, simple equipment may be used. It should also be readily understood that the coating devices 130 could be implemented as a single device extending across the web 1.

Preferably the coating devices 130 are controlled by the controller 120. The controller may e.g. receive input relating to web speed, whereby the coating devices 130 can be controlled accordingly so that the coated areas 14 are located at its respective desired positions.

The coating substance used for coating the areas 14 may be any suitable substance which may ablate when absorbing laser energy. Various types of inks or toners have been shown to fulfill this requirement. In particular, the selected coating substance should have a comparably high rate of absorption of infrared light having a wavelength below 1 μm. Optionally the coating substance may be provided with magnetizable particles such that the mark may be magnetically detectable. Such coating substance may e.g. comprise Magnetite.

Figure 4:
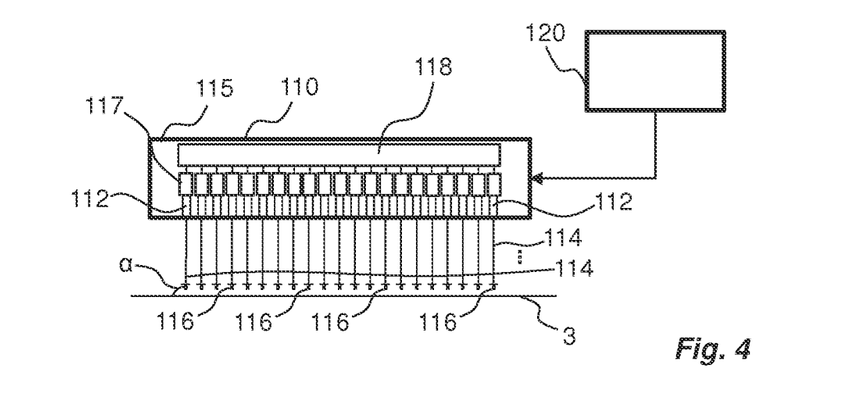
FIG. 4 is a schematic view of a marking device for use with the laser ablation marking system shown in FIG. 3.

Details of the marking device 110 are shown in FIG. 4. In this example the marking device 110 has twenty-one outputs 112, each output 112 being coupled to a laser 117. The number of outputs is generally preferred to be 16 or more, such as 21 or more, to have the information capacity desired for the purpose of marking and information-carrying in the packaging business. Each output is thus individually controllable by the controller 120, which is connected to one or more laser drivers 118. Each output 112 is further coupled to an optical fiber 114 which extends away from the device housing 115 and towards the web 1 of packaging material 3. At the distal end 116 of each fiber a laser beam will be allowed to exit, whereby it will hit a delimited portion of the coated area 14 to laser ablate the coated area 14. A multi-output marking device suitable for this configuration may e.g. include a series of laser diodes emitting light in a wavelength range of approximately 850-980 nm. Depending on the particular choice of coating substance, each laser diode has a light output of at least 60 W; preferably each laser diode may have a light output in the range of 60-1000 W in order to ablate the coating substance of a thickness of e.g. 5 µm. It should be realized that the selection of coating substance as well as the selected coating substance thickness will influence the absorption and consequently also the ablation properties.

The laser diodes should preferably be selected to operate at a wavelength which is fully, or at least to a major extent, absorbed by the coating substance. Additionally, absorption of the emitted light by the underlying core material layer should be avoided.

Hence each output 112 could be associated with a unique laser 117, or a single laser 117 could be coupled to a plurality of outputs 112, each output 112 being individually controllable.

The distal ends 116 are preferably arranged in a linear array, as shown in FIG. 4, extending perpendicular to the feeding direction of the packaging material i.e. in the cross-wise direction of the packaging material. When activated, each laser output 112 will emit light in a fixed direction, meaning that no dynamic deflection of the laser beam is provided. The emitted light will thus always hit the web 1 of packaging material 3 at the same angle.

Further, each distal end 116 is dimensioned such that each output 114 will ablate only a delimited area, or module, of the coated area 14. For example, the width of the laser beam being emitted from each distal end 116 is below 1 mm, such as in the order of 0.5 mm. Hence, the cross-wise resolution of the marking device 110 is in such case 0.5 mm. The module height is not fixed, but it varies with the speed of the web 1 of packaging material 3 as well as on the exposure time of the marking device 110. Assuming that the laser beam has a constant width of 0.4 mm, it may be preferred to apply an exposure time such that the web 1 of packaging material travels 0.1 mm during exposure. If the web 1 travels by a speed of 400 m/min, the exposure time will in such case be in the order of 0.15 ms. For the suggested module size of 0.5*0.5 mm and a web speed of 400 m/min the laser 117 of the marking device 110 may thus be pulsed using a pulse time of approximately 0.15 ms. However, in practice it may be preferred to utilize even shorter pulse times for providing more evenly ablated areas. Hence, a pulse time may e.g. be selected as 20 µs—for the above-mentioned example one consecutive pulse is occurring 0.15 ms after the previous pulse.

In the shown example the marking device 110 has a lateral width of 10.5 mm, the total width being defined by the twenty-one outputs.

Figure 5A:
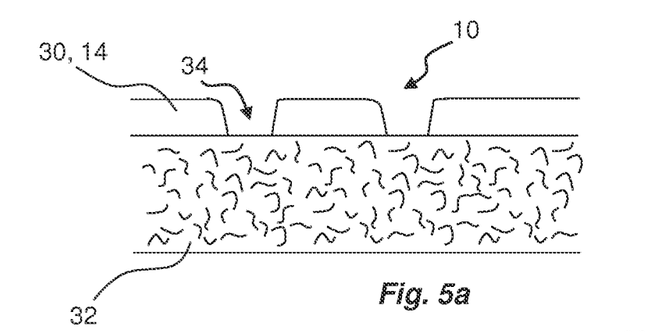
FIG. 5a is a cross-sectional view of a packaging material after laser ablation marking.

In FIG. 5a the packaging material 3 is shown after ablation. As can be seen the coating substance 30 is applied directly onto the core material layer 32 such that a coated area 14 is formed. Preferably the coated area 14 has a dark colour, primarily to achieve IR absorption of the laser beam, but also such that high contrast is achieved relative to the much brighter colour of the surface of the core material layer 32. The mark 10 is formed by ablating one or more recesses 34 into the coating substance 30 as explained above. The recesses 34 do not necessarily extend all the way down to the core material layer 32, but sufficient contrast may in fact be realized also if some coating substance 30 remains.

As is evident, the level of contrast of the mark will be dependent on the power of the laser light. As described above high power light output (i.e. >60 W) is required in order to achieve a robust ablation of the coating substance 30, especially for the high speed applications of packaging material manufacturing. As a comparison, prior art laser marking systems operating by activating colour transformable ink rather than ablating off substances from a coating 30, will not be suitable, or even compatible, with the design and configuration of the laser ablation marking system described herein.

Figure 5B:
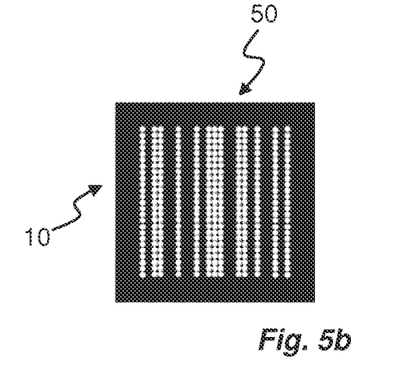
FIG. 5b shows a first example of a mark provided by the laser ablation marking system shown in FIG. 3.
Figure 5C:
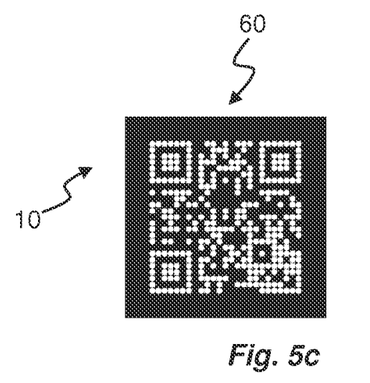
FIG. 5c shows a second example of a mark provided by the laser ablation marking system shown in FIG. 3.

In FIGS. 5b and 5c two different examples of marks 10 are shown. In FIG. 5b the mark 10 forms a bar code 50 which can be read by a suitable scanner. In FIG. 5c the mark 10 is in the form of a 2D-code 60, such as a QR code or similar. For both examples the mark 10 is square shaped, i.e. the resolution in cross-wise direction is equal to the resolution in lengthwise direction (21*21 pixels). This is however not required. The cross-wise resolution is determined by the number of laser outputs 112, while the lengthwise resolution is determined by the number of consecutive laser pulses as the web 1 of packaging material 3 passes the marking device 110. A mark 10 can thus have other longitudinal extensions, such as to provide rectangular shaped marks, whereby the limitation is set by the dimensions of the coated area 14.

Figure 6A:
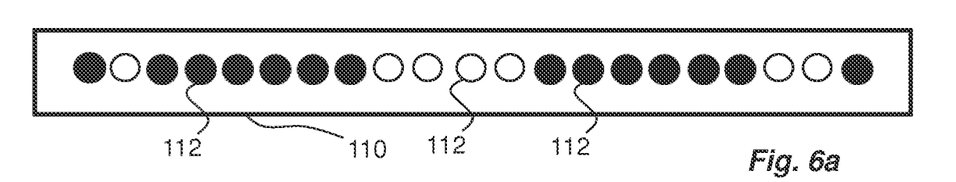
FIG. 6a-b are schematic views of parts of a marking device.
Figure 6B:
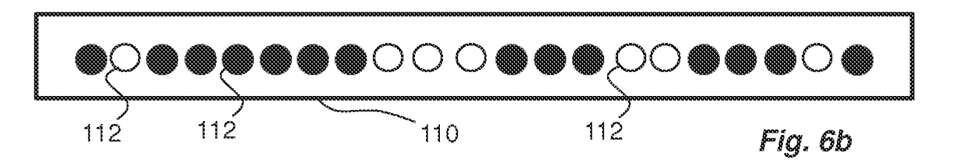

In FIGS. 6a and 6b an example of a control scheme for a marking device 110 is shown. In these figures the laser outputs 112 are shown as circles, and an active circle is marked as black. It should be noted that only a few of the outputs 112 are provided with reference numerals.

When the marking device 110 is activated, i.e. when a coated area 14 of a web 1 of packaging material 3 passes the marking device 110, the marking device 110 controls the emission of light through the respective outputs 112. Importantly, the outputs 112 are individually controllable. In FIG. 6a fourteen outputs are activated to emit light, while the remaining seven outputs are inactive. The pulse time is e.g. 0.15 ms in accordance with the above-mentioned example.

The next pulse will be emitted immediately after the first pulse, and the outputs 112 are controlled accordingly. As can be seen in FIG. 6b for this pulse another set of outputs 112 is activated to emit light. By continuing emitting pulses the mark matrix will grow in the lengthwise direction until the entire mark 10 is provided onto the packaging material 3.

Although the above-described example is directed to a laser ablation marking system using several consecutive laser pulses, the laser ablation marking system may in some embodiments be configured to ablate full lines without any intermissions by keeping the laser in an active, or light emitting mode as the web of packaging material passes by the marking system 100.

So far the laser ablation marking system 100 has been described to provide marks 10 at fixed positions on the packaging material. However, as will be understood from the following the marking system 100 can also be used to provide marks 10 at different positions, especially for ensuring the correct position of the mark 10 relative other features of the packaging material 3.

Figure 7:
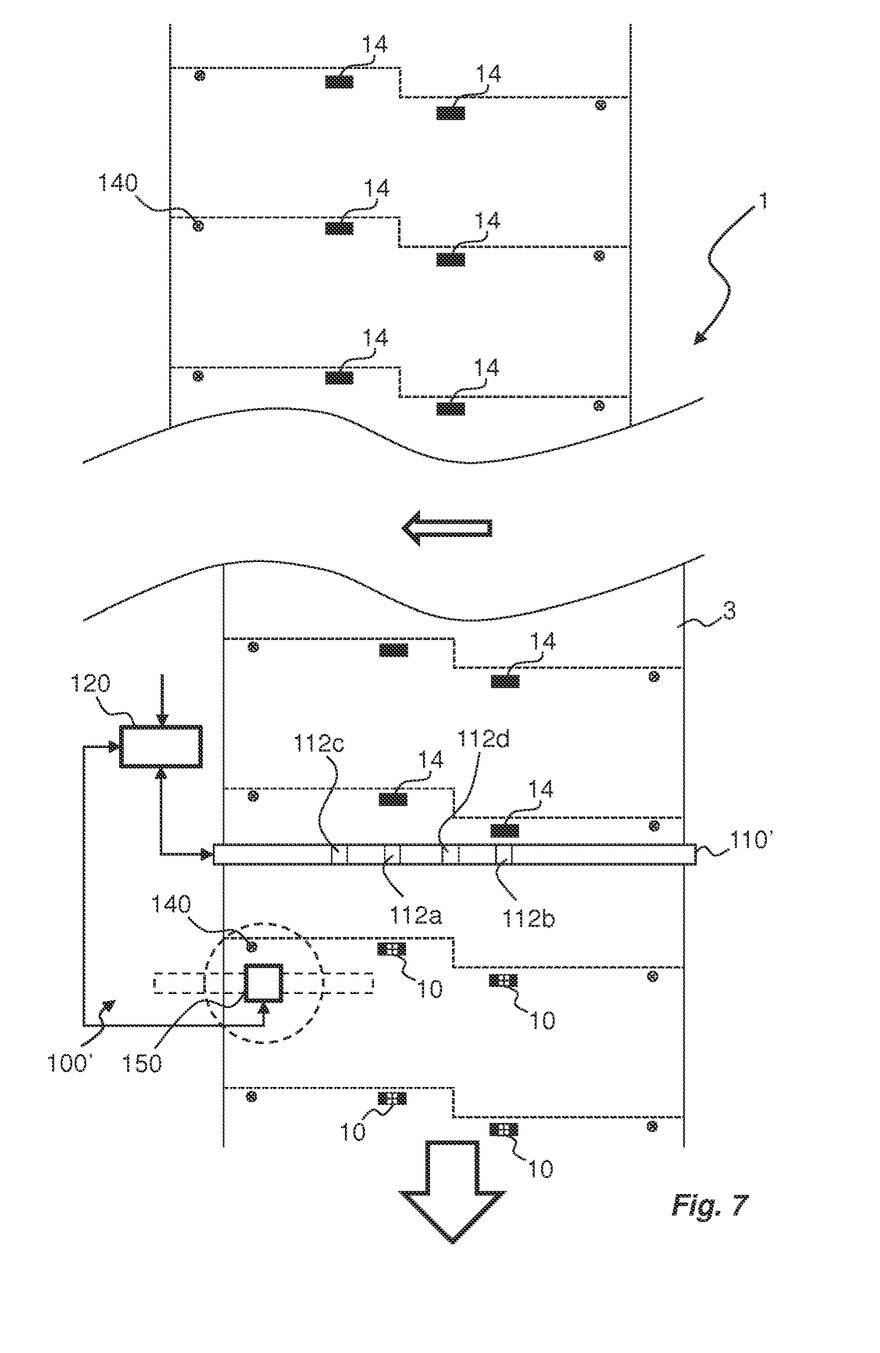
FIG. 7 is a schematic view of a laser ablation marking system according to another embodiment.

In FIG. 7 another example of a laser ablation marking system 100' is shown. The laser ablation marking system 100' comprises a marking device 110' extending across the entire width of the packaging material 3. As for the marking device 110 described above a plurality of light outputs are provided facing the moving packaging material 3, the sideways alignment of each output being individually controllable by the controller 120. The web 1 of packaging material 3 is provided with a plurality of coated areas 14, in the shown example the coated areas 14 are distributed such that each final package will be provided with one coated area 14. The power levels of the marking device 110' is similar to the marking device 110 described above, i.e. each light output is configured to emit light in the range of 60-1000 W, such as from 60 to 500 W.

The packaging material 3 is also provided with one or more reference marks 140. The reference marks 140 are provided to assist in correct positioning of the ablated marks 10. A sensor 150 is included in the marking system 100' and detects the position of the reference mark 140, especially the lateral or cross-wise position. The position of the detected reference mark 140 is transmitted to the controller which then associates the position of the reference mark 140 with the position of the already applied coated areas 14. As illustrated in FIG. 7 the dimensions of the coated areas 14 may be extended compared to the final dimensions of the mark 10. Hence, the controller 120 may subsequently determine a set of outputs 112 of the marking device 110' to be activated in order to ablate a desired portion of the coated area 14 in order to locate the mark 10 at its intended position.

It should be noted that for a downstream portion of the web 1, one set of outputs 112a is used for providing marks 10 on the left portion of the web 1, while another set of outputs 112b is used for providing marks 10 on the right portion of the web 1. Within each set of outputs 112a-b specific outputs are activated in a pulsed manner in order to form a growing mark 10 as the web 1 moves forward. Each output 112a-b is configured to emit light having and having a power output in the range of 60-500 W.

As indicated in FIG. 7 the web is shifted to the right after a certain time. This may be caused by a number of different reasons, such as unintentional misalignment in the feeding equipment or similar. If this shifting occurs the sensor 150 will detect a different lateral position of the reference mark 140, whereby the controller 120 will consequently determine new sets of outputs 112c-d of the marking device 110' so that the marks 10 are located correctly relative the reference mark 140.

From the description above follows that, although various embodiments of the invention have been described and shown, the invention is not restricted thereto, but may also be embodied in other ways within the scope of the subject-matter defined in the following claims.

The invention claimed is:

1. A laser ablation marking system for providing an image to a web of packaging material, comprising:
   at least one marking device having at least one laser comprising a plurality of individually controlled light outputs arranged in the cross-wise direction of the web of packaging material, each light output having a power output of at least 60 W and being configured to emit light to provide laser ablation, and
   a controller being connected to the marking device and configured to control the light outputs based on the speed of the web of packaging material such that the emitted light will always hit the web of packaging material at the same angle,
   wherein the plurality of light outputs are arranged in a linear array,
   wherein the linear array extends in a direction being perpendicular to the travel direction of the web of packaging material, and
   wherein when generating the image, the controller is configured to activate the marking device in a pulsed manner corresponding with the speed of the web, so that the cross-wise resolution of the image is determined by the number of light outputs in the linear array, while the lengthwise resolution of the image is determined by the number of consecutive laser pulses from each light output in the linear array as, when each light output is in use to generate the image, only a single laser pulse is emitted from each light output at each lengthwise position and each cross-wise position of the image as the web of packaging material passes the marking device.

2. The marking system according to claim 1, wherein each light output has a power output in the range of 60-1000 W.

3. The marking system according to claim 2, wherein each light output has a power output in the range of 60 to 500 W, and wherein the speed of the web of packaging material is 300 m/min or greater.

4. The marking system according to claim 1, further comprising at least one coating device configured to provide a coated area onto the web of packaging material.

5. The marking system according to claim 4, wherein the at least one coating device is arranged upstream the at least one marking device.

6. The marking system according to claim 1, wherein the number of light outputs is above fifteen.

7. The marking system according to claim 6, wherein the number of light outputs is above twenty.

8. The marking system according to claim 1, wherein each light output is connected to an optical fiber having a distal end at which a laser beam is allowed to exit.

9. The marking system according to claim 1, wherein a dimension of the outputted laser beam, when hitting the web of packaging material, is 1 $mm^2$ or less.

10. The marking system according to claim 1, further comprising a source of the web packaging material that is fed downstream continuously to pass the marking device.

11. The marking system according to claim 1, wherein for each pulse, the plurality of light outputs are controlled individually.

12. The marking system according to claim 1, wherein the controller is configured to controlling each light output binary to either emit light or not.

13. The marking system according to claim 1, wherein the controller is configured to controlling the marking device in order to ablate selected parts of a coating substance arranged on a coated area on said web of packaging material.

14. The marking device according to claim 13, wherein the controller is configured to controlling the marking device to ablate the entire layer of coating substance at said selected parts.

15. The marking device according to claim 13, wherein the controller is configured to controlling the marking device to ablate only a part of the layer of coating substance at said selected parts.

16. A method for providing an image to a web of packaging material, comprising:
   feeding the web of packing material continuously in a downstream direction;
   providing at least one marking device having at least one laser and a plurality of individually controlled light outputs connected to said at least one laser, wherein each light output is configured to emit light having a power output of at least 60 W in order to provide laser ablation, wherein the plurality of light outputs are arranged in a linear array,
   providing a controller being connected to the marking device and configured to control the light outputs based on the speed of the web of packaging material, and
   controlling at least one of the light outputs to emit light in order to ablate selected parts of a coating substance arranged on a coated area on said web of packaging material such that the emitted light will always hit the web of packaging material at the same angle, extending the linear array in a direction being perpendicular to the travel direction of the web of packaging material, and generating the image on the web of packaging material by controlling the marking device with the controller in a pulsed manner corresponding with the speed of the web, so that the cross-wise resolution of the image is determined by the number of light outputs in the linear array, while the lengthwise resolution of the image is determined by the number of consecutive laser pulses from each light output in the linear array as, when each light output is in use to generate the image, only a single laser pulse is emitted from each light output at each lengthwise position and each cross-wise position of the image as the web of packaging material continuously passes the marking device.

17. The method according to claim 16, further comprising:

applying the coating substance at one or more coated areas on the web of packaging material using at least one coating device arranged upstream of the at least one marking device, wherein the generating the image on the web of packaging material includes ablating the selected parts of the coating substance using the single laser pulse emitted from each light output in the linear array at each lengthwise position and each cross-wise position of the image as the web of packaging material continuously passes the marking device, such that each ablated part of the coating forms a dot that provides visual contrast with neighboring non-ablated parts of the coating substance, and the image generated comprises a pattern of the dots having the cross-wise resolution and the lengthwise resolution, in which each dot of the pattern provides the same visual contrast as the other dots in the pattern.

18. The method according to claim 16, wherein the same light output power is used for each single laser pulse at each lengthwise position and each cross-wise position of the image.

19. The method according to claim 16, further comprising:

detecting shifting of the web of packaging material by using a sensor that detects a change in the lateral position of a reference mark located on the web of packaging material, and using the controller to control the light outputs based upon the detected change in the lateral position of the reference mark to account for the shifting of the web of packaging material.

20. A laser ablation marking system for providing an image to a web of packaging material, comprising:

at least one marking device having at least one laser comprising a plurality of individually controlled light outputs arranged in the cross-wise direction of the web of packaging material, each light output having a power output of at least 60 W and being configured to emit light to provide laser ablation, and a controller being connected to the marking device and configured to control the light outputs based on the speed of the web of packaging material such that the emitted light will always hit the web of packaging material at the same angle, wherein the plurality of light outputs are arranged in a linear array, wherein the linear array extends in a direction being perpendicular to the travel direction of the web of packaging material, wherein when generating the image, the controller is configured to activate the marking device in a pulsed manner, so that the cross-wise resolution of the image is determined by the number of laser outputs, while the lengthwise resolution of the image is determined by the number of consecutive laser pulses as, in use, the web of packaging material passes the marking device, wherein the marking system further comprises a sensor configured to detect a change in lateral position of a reference mark located on the web of packaging material, and wherein the controller is configured to control the light outputs based upon the detected change in the lateral position of the reference mark to account for shifting of the web of packaging material.

21. A laser ablation marking system for providing an image to a web of packaging material, comprising:

at least one marking device having at least one laser comprising a plurality of individually controlled light outputs arranged in the cross-wise direction of the web of packaging material, each light output having a power output of at least 60 W and being configured to emit light to provide laser ablation, and a controller being connected to the marking device and configured to control the light outputs based on the speed of the web of packaging material such that the emitted light will always hit the web of packaging material at the same angle, wherein the plurality of light outputs are arranged in a linear array, wherein the linear array extends in a direction being perpendicular to the travel direction of the web of packaging material, wherein the controller is configured to activate the marking device in a pulsed manner, so that the cross-wise resolution is determined by the number of laser outputs, while the lengthwise resolution is determined by the number of consecutive laser pulses as, in use, the web of packaging material passes the marking device, and wherein the packaging material is also provided with one or more reference marks, and a sensor is included in the marking system configured to detect a position of the reference mark, especially the lateral or cross-wise position so that the position of the detected reference mark is transmitted to the controller which is configured to associate the position of the reference mark with a position of already applied coated areas.

* * * * *